(12) United States Patent
Key

(10) Patent No.: US 6,178,759 B1
(45) Date of Patent: Jan. 30, 2001

(54) RUPTURE DISK

(76) Inventor: Mark B. Key, 6434 Harting Overlook, Indianapolis, IN (US) 46237

( * ) Notice: Under 35 U.S.C. 154(b), the term of this patent shall be extended for 0 days.

(21) Appl. No.: 09/385,777

(22) Filed: Aug. 30, 1999

(51) Int. Cl.[7] ....................................................... F25B 45/00
(52) U.S. Cl. .............................. 62/149; 62/86; 137/68.19
(58) Field of Search ........................ 62/149, 174, 324.4, 62/86, 475; 137/68.19, 68.23

(56) References Cited

U.S. PATENT DOCUMENTS

| | | |
|---|---|---|
| 3,044,479 | 7/1962 | Meyer et al. . |
| 3,854,522 | 12/1974 | Didycz et al. . |
| 4,102,469 | 7/1978 | Shegrud et al. . |
| 4,434,905 | 3/1984 | Ou et al. . |
| 4,936,350 | 6/1990 | Huber . |
| 4,937,019 | 6/1990 | Scott . |
| 4,978,947 | 12/1990 | Finnegan . |
| 5,012,945 | 5/1991 | Keenan . |
| 5,155,471 | 10/1992 | Ellis et al. . |
| 5,279,321 | 1/1994 | Krimm . |
| 5,379,604 | * 1/1995 | Furr ........................................... 62/77 |
| 5,577,389 | * 11/1996 | Albertson et al. ....................... 62/115 |
| 5,644,930 | * 7/1997 | Albertson et al. ....................... 62/475 |
| 5,673,563 | * 10/1997 | Albertson et al. ........................ 62/56 |

* cited by examiner

Primary Examiner—Corrine McDermott
Assistant Examiner—Marc Norman
(74) Attorney, Agent, or Firm—Woodard, Emhardt, Naughton, Moriarty & McNett Patent and Trademark Attorneys Bank One Center Tower

(57) ABSTRACT

A rupture disk for a refrigeration unit that, upon bursting, does not interfere with the operation of a downstream, normally closed, mechanical relief valve. The disk is designed to rupture at predetermined pressure and is made of a compressed powder or an organic wax that dissolves in the refrigerant. The process side of the disk, i.e. the side facing the evaporator, is covered with a film that is impermeable to the particular halocarbon refrigerant in use. Upon rupture, fractures from a disk that is made of compressed powder readily pass through a downstream mechanical relief valve because the fragments are small and have a uniform geometry. Upon rupture, fractures from a disk that is made of organic wax readily pass through a downstream mechanical relief valve because they have all or partially dissolved in the halocarbon refrigerant.

10 Claims, 2 Drawing Sheets

RUPTURE DISK

The present invention generally relates to rupture disks, and more particularly relates to rupture disks with a membrane that, upon bursting, do not interfere with the operation of a downstream, normally closed, relief valve.

BACKGROUND OF THE INVENTION

A low-pressure centrifugal chiller vessel has many commercial and industrial applications, such as providing air conditioning to hotels, cooling fluid to a manufacturing process, or commercial food refrigeration. Inherent to their use is an expectation that these systems will have a minimal amount of down time. Low-pressure centrifugal refrigeration systems are typically operated without maintenance until a breakdown occurs, and only then is any repair/maintenance service performed. The down time that results from this kind of reactive maintenance program is, at best, an inconvenience for the user. But frequently the down time can also have costly consequences, such as food spoilage if the application is commercial food refrigeration.

A mechanical refrigeration system with a low-pressure centrifugal chiller vessel typically uses a chlorofluorocarbon (CFC) refrigerant. Some typical CFC refrigerants are those sold by DuPont under the trademark FREON. CFC refrigerants vary by boiling point; for example, some rather common CFC refrigerants are R-11, R-113, and R-123. These as well as other CFC refrigerants are well-known and widely used as heat transfer media in mechanical refrigeration.

Refrigeration systems generally require the pressurized storage of a vaporized refrigerant. For example, a low-pressure centrifugal chiller vessel generally operates under a vacuum of about sixteen inches of mercury, and should not operate at a pressure exceeding fifteen pounds per square inch above atmospheric pressure. To comply with applicable safety codes in this regard, these systems have a pressure relief system to vent a storage vessel that becomes over-pressurized. For many years, it was the practice in industry to design the relief system to vent the CFC refrigerant from the over-pressurized storage vessel directly into the atmosphere. Recently; however, because of concerns for the possible destruction of the ozone layer above the earth, it has become desirable, and in some cases mandatory, to minimize the release of CFC refrigerants. And environmental concerns, though sufficient, are not the only factor in favor of preventing the loss of CFC refrigerants. The cost of CFC refrigerants has escalated drastically, which in some cases has risen over ten fold in only the past few years.

Hence, it has become industry practice to add a mechanical, normally closed, re-seating relief valve to the pressure relief system of most mechanical refrigeration systems to minimize the amount of CFC refrigerant that may be vented into the atmosphere during an over pressure condition. This valve is placed in series downstream from a fragmentary carbon rupture disk. The fragmentary carbon disk is calibrated to burst into pieces at a predetermined maximum pressure. At any pressure up to the maximum pressure, the carbon rupture disk provides an excellent positive seal to prevent the venting of CFC refrigerant and the infiltration of any contaminants into the refrigeration system. The combination of the fragmentary carbon rupture disk and the mechanical, normally closed, re-seating relief valve, provides the positive seal characteristics of the carbon rupture disk and a method to close the relief vent to retain the CFC refrigerant once the disk has burst and the over-pressure condition has passed.

A common limitation of refrigeration systems having a mechanical re-seating relief valve downstream from a fragmentary carbon rupture disk is that the fragments from the burst carbon rupture disk often lodge in the valve seat of the relief valve. Naturally, any debris or fragments of significant size that lodge in the seat will interfere with the relief valve's ability to later close, and absent the positive seal that is normally provided by a mechanical re-seating relief valve, the CFC refrigerant would continue to vent into the atmosphere.

Many designers of refrigeration systems have attempted to overcome this common limitation by utilizing a non-fragmentary, metal rupture disk in place of a fragmentary carbon disk. The use of the metal rupture disk does prevent fragments of the burst rupture disk from interfering with the re-seating of the mechanical relief valve. However, the metal disk leaves unsolved a litany of other problems and creates a particularly undesirable consequence of its own. For example, one limitation of many metal rupture disks pertains to the bent metal from the rupture disk disturbing the fluid flow characteristics of the exiting fluid that can interfere with the operation of the mechanical relief valve.

As a result, there is a need for a rupture disk that does not interfere with the operation of a downstream mechanical relief valve. The present invention is one solution that satisfies this need in a novel and unobvious way.

SUMMARY OF THE INVENTION

One form of the present invention contemplates a pressure relief assembly for use with a halocarbon refrigerant that includes a disk with a process face and a relief face. The disk is made of compressed powder and is designed to rupture when the pressure applied to the process face exceeds the pressure applied to the relief face by a predetermined difference. A film covers the process side of the disk and is substantially chemically impermeable to the refrigerant.

Another form of the present invention contemplates a pressure relief assembly for use with a halocarbon refrigerant that includes a disk with a process face and a relief face. The disk is made of a wax that normally dissolves on contact with the refrigerant and is designed to rupture when the pressure applied to the process face exceeds the pressure applied to the relief face by a predetermined difference. A film covers the process side of the disk and is substantially chemically impermeable to the refrigerant.

Yet another form of the present invention contemplates the inclusion of either of the foregoing pressure relief assemblies in a fluid containment system. The system includes a mechanical refrigeration system with an evaporator. Either of the foregoing pressure relief assemblies is then placed in fluid communication with the evaporator, followed by a normally closed, mechanical pressure relief valve that is placed in series with the relief side of the disk.

One object of the present invention is to provide an improved rupture disk that will not interfere with the operation of a downstream, normally closed, mechanical relief valve.

Related objects and advantages of the present invention will be apparent from the following description.

DESCRIPTION OF THE PREFERRED EMBODIMENTS

Figure 1:
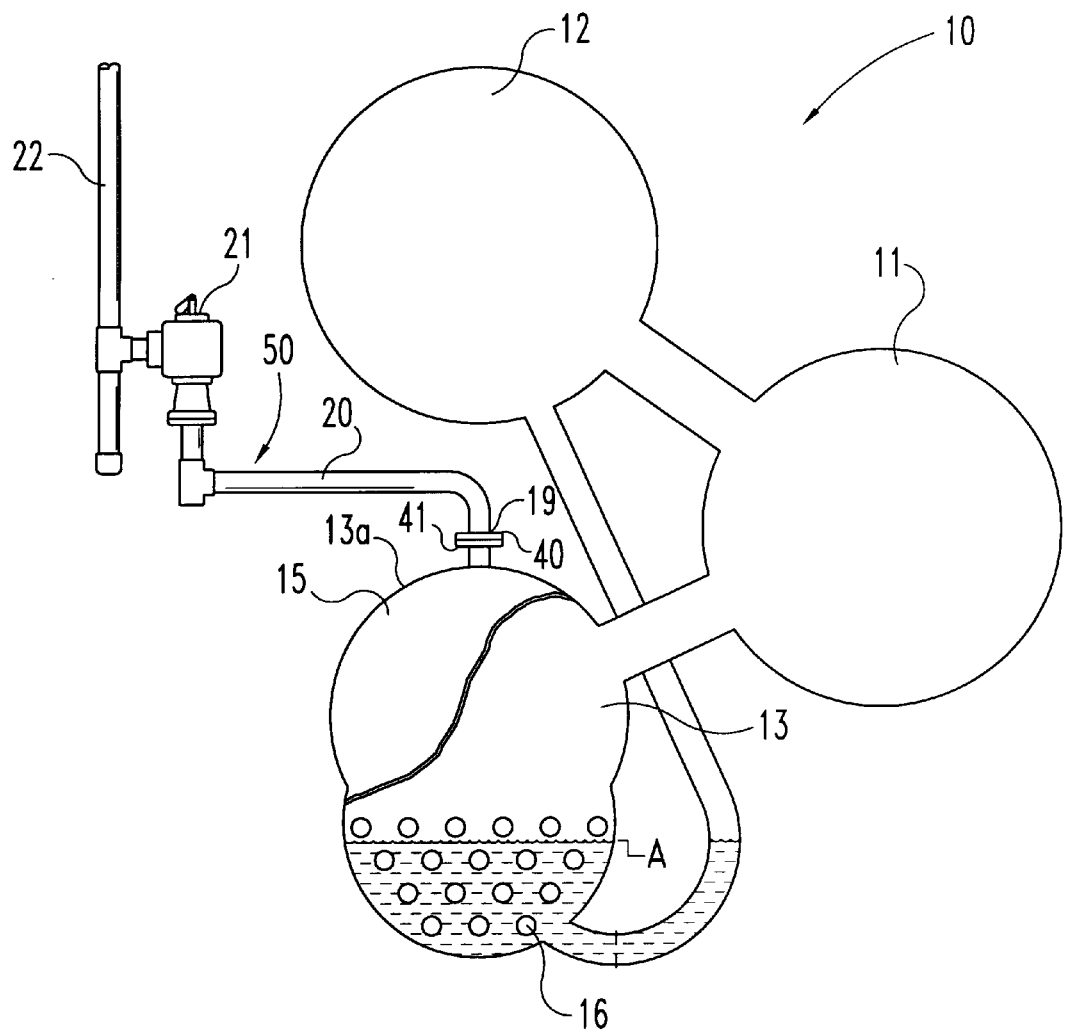
FIG. 1 is an illustrative side elevational view of a centrifugal refrigeration unit.

For the purposes of promoting an understanding of the principles of the invention, reference will now be made to the embodiment illustrated in the drawings and specific language will be used to describe the same. It will, nevertheless, be understood that no limitation of the scope of the invention is thereby intended, and such alterations and further modifications of the illustrated device, and such further applications of the principles of the invention as illustrated therein being contemplated as would normally occur to one skilled in the art to which the invention relates.

Referring to FIG. 1, there is shown a mechanical refrigeration system 10, which is comprised of a closed loop system having three primary components, a compressor 11, a condenser 12, and an evaporator 13. A halocarbon refrigerant flows through the closed loop system. Suitable refrigerants which are usable in the refrigeration system 10 include all manmade refrigerants, such as FREON 12, R11, R113 or other chlorofluorocarbons (CFC), hydrofluorocarbons (e.g. HFC 134), and hydrochlorofluorocarbons (e.g. HCFC-123).

It is well known to a person skilled in the art that the compressor 11 is utilized to compress the refrigerant fluid from a relatively low-pressure gaseous state to a higher-pressure gaseous state. The relatively high-pressure refrigerant gas upon exiting the compressor flows into the condenser 12, which functions as a heat exchanger. The condenser 12 removes energy from the vaporized refrigerant to facilitate the condensation of the relatively high-pressure refrigerant vapor into a liquefied refrigerant. The cooled liquid refrigerant then generally flows through an expansion device that reduces the pressure and regulates the flow of refrigerant fluid into the evaporator 13.

The evaporator 13 is of a conventional shell and tube type, and generally includes an elongated cylindrical shell 15 with a plurality of tubes 16 that pass through shell 15. The heat exchange media that is to be cooled (e.g. brine, a water-glycol solution or water) is passed through the tubes 16. The heat exchange medium then cools within the tubes 16 as the refrigerant fluid absorbs heat from the tubes 16, which occurs as the refrigerant fluid is vaporized into a low-pressure refrigerant gas. The low-pressure refrigerant gas is then drawn through a suction line between the evaporator 13 and the compressor 11, where the entire cycle begins again. Further details of the operation of refrigeration systems can be found in U.S. Pat. Nos. 5,542,261; 5,241,837; 4,267,705; 3,276,216; 3,131,548 the disclosure of which is hereby incorporated by reference.

Normally, the evaporator 13 is designed to operate under a vacuum of about 16 inches of mercury; however, the pressure within the evaporator shell should not be allowed to exceed 15 pounds per square inch gauge (psig). Therefore, in order to comply with applicable safety codes and to protect the equipment, a pressure relief system 50 is connected to evaporator 13 to allow the venting of refrigerant gas when the pressure within the evaporator exceeds 15 psig. Preferably, the pressure relief system 50 includes rupture disc 19 and a reseating, normally closed, pressure relief valve 21. Rupture disk 19 is disposed in fluid communication with the topside 13a of evaporator 13. The reseating, normally closed, pressure relief valve 21 is connected with rupture disk 19 through a conduit 20. Typically, rupture disk 19 is designed to burst at a pressure of about 15 psig; however, it should be readily understood that rupture disks having other bursting pressures are also contemplated by this invention.

In one preferred embodiment the rupture disk 19 is generally made of compressed powder. In this embodiment the disk 19 is manufactured by placing an appropriate amount of powder in a die having a predetermined, preferably circular shape. The powder is then compressed to form a disk. The die may have two halves, with the powder deposited into a first mold half and with the second mold half being used to compress and shape the powder within the first mold half. The pressure during compression is selected from a pressure range that is known to produce a disk with a given burst or rupture pressure. The temperature during compression preferably is selected from temperatures commonly used in fabricating compressed structures from the specific powder selected. Preferred powders for use in accordance with the present invention include powders of porcelain, silicon, graphite, molecular sieves, and plastics or mixtures thereof. The particles of the powder preferably have a particle size residing within a distribution of about 0.001 inches to about 1 micron. Such a powder can be obtained by conventional grinding techniques, followed by sizing with a mesh screen or conventional air classifier. However, the present disclosure is not intended to be limited to these specific powders.

In another preferred embodiment, the rupture disk 19 is generally made of an organic wax that will dissolve in the presence of a halocarbon refrigerant. In this embodiment the disk 19 is manufactured by molding the wax in a predetermined, preferably circular shape. An appropriate amount of material is placed in one half a die. The organic wax is then compressed with or without heating. Typically the die would have two halves, with the wax deposited into a first mold half and the second mold half being used to compress and shape the wax within the first mold half. The pressure during compression is generally that which is sufficient to produce a uniform shape and remove air pockets from the wax material. The temperature of the wax during molding is preferably selected from temperatures commonly used in fabricating molded structures from the specific waxed selected. Preferred waxes for use in accordance with the present invention include, but are not limited, to paraffin wax and bees wax.

Figure 2:
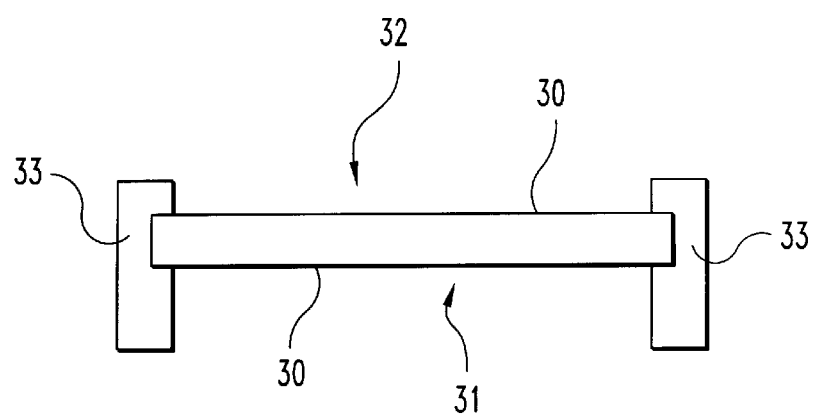
FIG. 2 is a side elevational view of one embodiment of the present invention.
Figure 3:
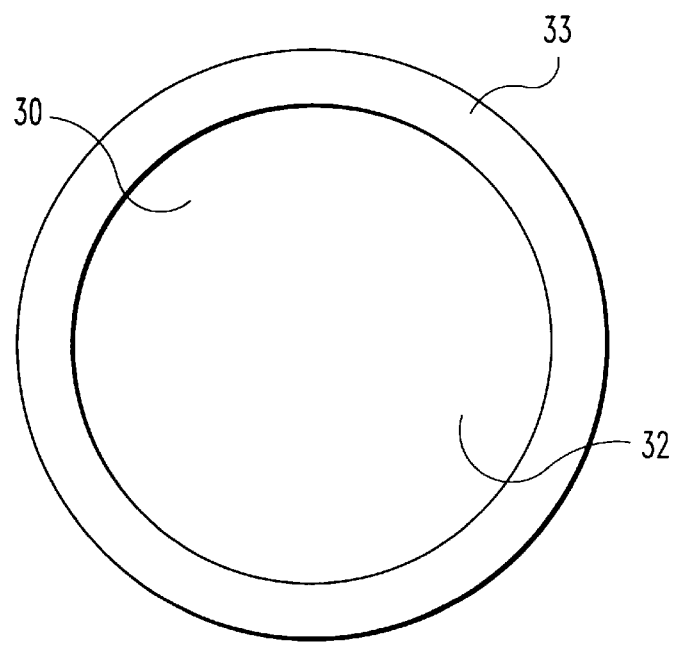
FIG. 3 is a top plan view of one embodiment of the present invention.

Referring to FIGS. 2 and 3, once the disk 19 is formed from either powder or wax, a thin foil or film 30 is placed over the process face 31 of the disk 19, or preferably, is placed over both the process face 31 and the relief face 32. Film 30 is chemically impermeable to the halocarbon in use and serves to prevent the halocarbon from passing through the rupture disk by diffusion, before the disk ruptures. Examples of suitable materials for this film include, but are not limited to a thin metallic foil. Further, other types of materials, which are contemplated herein for the film, but not intended to be limiting herein, include Teflon, Viton, Buna-N, Silicon and other foils compatible with refrigerant. The film has a thickness sufficient to prevent diffusion at normal operating temperatures and pressures, and in one preferred embodiment the film thickness is less than or equal to about 0.001 inch, and in another embodiment the film thickness is about 0.001 inch. The film 30 is preferably held against one or both sides of the disk 19 by rim 33, which is preferably manufactured of a metal such as, but not limited to, stainless steel or an anodized aluminum. The disk 19 is then installed in the refrigeration system in about any conventional manner, which is typically performed by sandwiching the rim 33 between two piping flanges 40 and 41 as shown in FIG. 1.

In operation, the disk 19 and the relief valve 21 are both calibrated to open when evaporator 13 reaches a predetermined pressure. If this pressure is exceeded, the disk 19 bursts and the sealing faces of mechanical relief valve 21 part to allow excess halocarbon refrigerant to escape from the evaporator 13 to either a receiving vessel (not shown) or the atmosphere.

One advantage of the present invention occurs when the overpressure condition in evaporator 13 has passed and the mechanical relief valve 21 attempts to close to prevent any further halocarbon refrigerant from escaping from the refrigeration unit. When the disk 19 is made of powder, the fractures formed when the disk bursts readily pass through the mechanical relief valve 21 because they are small and have a uniform geometry. Alternatively, when the disk 19 is made of an organic wax, the fractures formed when the disk bursts readily pass through mechanical relief valve 21 because they have all or partially dissolved in the halocarbon refrigerant that is now present. Hence in either embodiment, there are no substantial portions of the disk 19 that will become lodged between the sealing faces of the mechanical relief valve 21 to prevent the valve from returning to its fully closed position. As to the film 30, it will not impede the mechanical relief valves operation because the film 30 will shred into pieces that are so thin they could not prevent the mechanical relief valve 21 from closing even if they become lodged between the sealing faces of the valve. As a result, either a disk 19 that is composed of powder or one composed of organic wax will help prevent any further refrigerant from escaping the mechanical refrigeration system by assuring that the mechanical relief valve 21 can operate as it was intended.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A pressure relief assembly for use with a halocarbon refrigerant, comprising:
   (a) a disk with a process face and a relief face, said disk designed to rupture when the pressure applied to the process face exceeds the pressure applied to the relief face by a predetermined difference, said disk further comprised of compressed powder; and
   (b) a first film covering the process face of said disk, said first film being substantially chemically impermeable to a halocarbon refrigerant.

2. The pressure relief assembly of claim 1, including:
   (c) a normally closed relief valve in fluid communication with the relief face of said disk, wherein during a period when the predetermined difference is exceeded by an amount that causes said disk to rupture and said relief valve to open, said disk will fracture into pieces of compressed powder that do not interfere with the sealing faces of said relief valve when said relief valve returns closed after the predetermined difference is no longer exceeded.

3. The pressure relief assembly of claim 1, including:
   (c) a second film covering the relief face of said disk, said second film being substantially chemically impermeable to a halocarbon refrigerant.

4. A fluid containment system for minimizing the loss of refrigerant fluid, comprising:
   (a) a mechanical refrigeration system incorporating refrigerant fluid;
   (b) an evaporator within said refrigeration system, said evaporator for receiving fluid therein; and
   (c) a pressure relief assembly comprised of a disk with a process face and a relief face, said disk designed to rupture when the pressure applied to the process face exceeds the pressure applied to the relief face by a predetermined difference, said disk further comprised of a wax that normally dissolves on contact with a halocarbon refrigerant;
   (d) a first film covering the process face of said disk, said first film in fluid communication with said evaporator; and
   (e) a normally closed relief valve in fluid communication with the relief face of said disk, wherein during a period when the predetermined difference is exceeded by an amount that causes said disk to rupture and said relief valve to open; said disk will fracture into pieces that do not interfere with the sealing faces of said relief valve when said relief valve returns closed after the predetermined difference is no longer exceeded.

5. The pressure relief assembly of claim 4, including:
   (f) a second film covering the relief face of said disk, said second film being substantially chemically impermeable to a halocarbon refrigerant.

6. A pressure relief assembly for use with a halocarbon refrigerant, comprising:
   (a) a disk with a process face and a relief face, said disk designed to rupture when the pressure applied to the process face exceeds the pressure applied to the relief face by a predetermined difference, said disk further comprised of a wax that normally dissolves on contact with a halocarbon refrigerant; and
   (b) a first film covering the process face of said disk, said first film being substantially chemically impermeable to a hydrocarbon refrigerant.

7. The pressure relief assembly of claim 6, including:
   (c) a normally closed relief valve in fluid communication with the relief face of said disk, wherein during a period when the predetermined difference is exceeded by an amount that causes said disk to rupture, said relief valve to open, and the halocarbon refrigerant to pass; said disk will break up into pieces that substantially dissolve in the halocarbon and prevent the pieces from interfering with the sealing faces of said relief valve when said relief valve returns closed after the predetermined difference is no longer exceeded.

8. The pressure relief assembly of claim 6, including:
   (c) a second film covering the relief face of said disk, said second film being substantially chemically impermeable to a halocarbon refrigerant.

9. A fluid containment system for minimizing the loss of refrigerant fluid, comprising:
   (a) a mechanical refrigeration system incorporating refrigerant fluid;
   (b) an evaporator within said refrigeration system, said evaporator for receiving fluid therein; and
   (c) a pressure relief assembly further comprised of a disk with a process face and a relief face, said disk designed to rupture when the pressure applied to the process face exceeds the pressure applied to the relief face by a predetermined difference, said disk further comprised of a wax that normally dissolves on contact with a halocarbon refrigerant;

(d) a first film covering the process face of said disk, said first film in fluid communication with said evaporator; and (e) a normally closed relief valve in fluid communication with the relief face of said disk, wherein during a period when the predetermined difference is exceeded by an amount that causes said disk to rupture, said relief valve to open, and the halocarbon refrigerant to pass; said disk will fracture into a plurality of pieces that substantially dissolve in the halocarbon and thereby prevent the plurality of pieces from interfering with the sealing faces of said relief valve when said relief valve closes after the predetermined difference is no longer exceeded.

10. The pressure relief assembly of claim 9, including:

(f) a second film covering the relief face of said disk, said second film being substantially chemically impermeable to a halocarbon refrigerant.

\* \* \* \* \*